(12) United States Patent  
Schmidt (10) Patent No.: US 11,603,188 B2
(45) Date of Patent: Mar. 14, 2023

(54) AUTONOMOUS ELECTRIC TAXIING WHEEL WITH ELECTRICALLY ACTUATED BRAKE

(71) Applicant: Safran Landing Systems Canada Inc., Ajax (CA)

(72) Inventor: Robert Kyle Schmidt, Brooklin (CA)

(73) Assignee: SAFRAN LANDING SYSTEMS CANADA INC., Ajax (CA)

( * ) Notice: Subject to any disclaimer, the term of this patent is extended or adjusted under 35 U.S.C. 154(b) by 373 days.

(21) Appl. No.: 16/868,374

(22) Filed: May 6, 2020

(65) Prior Publication Data

US 2021/0347468 A1 Nov. 11, 2021

(51) Int. Cl.
| | |
|---|---|
| *B64C 25/40* | (2006.01) |
| *B64C 25/44* | (2006.01) |
| *F16D 67/02* | (2006.01) |
| *F16H 25/22* | (2006.01) |
| *F16D 65/18* | (2006.01) |
| *F16D 121/24* | (2012.01) |
| *F16D 125/40* | (2012.01) |
| *F16D 55/36* | (2006.01) |
| *F16H 25/20* | (2006.01) |

(52) U.S. Cl.
CPC ............ *B64C 25/405* (2013.01); *B64C 25/44* (2013.01); *F16D 65/186* (2013.01); *F16D 67/02* (2013.01); *F16H 25/2204* (2013.01); *F16D 55/36* (2013.01); *F16D 2121/24* (2013.01); *F16D 2125/40* (2013.01); *F16H 2025/2075* (2013.01)

(58) Field of Classification Search
CPC ......... B64C 25/34; B64C 25/40; B64C 25/44; B64C 25/405; F16D 65/186; F16D 69/02

USPC ...... 188/71.5, 72.1, 156–164; 244/50.103 R, 244/110 A, 111; 301/6.2
See application file for complete search history.

(56) References Cited

U.S. PATENT DOCUMENTS

| | | | |
|---|---|---|---|
| 8,839,918 B2 * | 9/2014 | Thibault ................ | H02K 11/33 188/158 |
| 9,540,097 B2 | 1/2017 | Schmidt et al. | |
| 9,815,551 B2 | 11/2017 | Drennen et al. | |
| 2011/0156472 A1 | 6/2011 | Bucheton et al. | |

(Continued)

OTHER PUBLICATIONS

International Search Report dated Aug. 9, 2021, issued in corresponding International Application No. PCT/CA2021/050624, filed May 4, 2021, 3 pages.

(Continued)

*Primary Examiner* — Christopher P Schwartz
(74) *Attorney, Agent, or Firm* — Christensen O'Connor Johnson Kindness PLLC (57) ABSTRACT

A landing gear system includes a wheel rotatably coupled to the axle about an axis. A motor is fixedly positioned relative to the axle with a clutch assembly operably coupled to an output shaft of the motor. The landing gear includes an actuator and a drive assembly. The actuator applies a braking force to the wheel. The drive assembly includes a pinion gear and a drive gear rotatably associated with the pinion gear. The drive gear is configured to transfer a rotational force to the wheel in order to provide autonomous taxiing capability. Both the brake assembly and the drive assembly are operably coupled to the clutch assembly so that the output shaft of the motor drives both the brake assembly and the drive assembly.

14 Claims, 4 Drawing Sheets

(56) References Cited

U.S. PATENT DOCUMENTS

| | | | |
|---|---|---|---|
| 2016/0039519 A1* | 2/2016 | Didey | B64C 25/34 244/103 S |
| 2016/0200428 A1* | 7/2016 | Morris | B64C 25/34 244/50 |
| 2017/0029096 A1* | 2/2017 | Didey | F16C 23/086 |
| 2021/0253227 A1* | 8/2021 | Schmidt | B64C 25/405 |

OTHER PUBLICATIONS

Written Opinion dated Aug. 9, 2021, issued in corresponding International Application No. PCT/CA2021/050624, filed May 4, 2021, 5 pages.

* cited by examiner

AUTONOMOUS ELECTRIC TAXIING WHEEL WITH ELECTRICALLY ACTUATED BRAKE

BACKGROUND

Autonomous drive devices allowing aircraft to be moved without the assistance of a tractor while the jet engines of the aircraft are not currently in operation. These devices are typically proposed to operate by providing drive capabilities to one or more wheels of an aircraft. By utilizing electric or hydraulic motors (or other power sources) to drive the wheels, operators can push back from gates and taxi without having to use their jet engines or tow tractors. As a result, fuel costs, wear and maintenance on the jet engines, and noise are all reduced.

An exemplary embodiment of a known autonomous drive device is disclosed in U.S. Pat. No. 9,540,097, issued to Schmidt et al., ("Schmidt") and currently assigned to Safran Landing Systems, the disclosure of which is expressly incorporated herein. Schmidt teaches an aircraft undercarriage, i.e., landing gear, that includes a landing gear strut mounted at one end to an aircraft and coupled to an axle at the other end. A pair of wheels are mounted to the axle. Motor units rotate a series of rods and shafts, including a pair of drive shafts, that extend down through the strut and are connected to each other by an angle transmission and bevel gears. The motor units rotate the drive shafts, which are disposed within the axle and connected to the wheels, to provide the system with drive capabilities.

While known systems that provide autonomous taxiing exist for powering the wheels of an aircraft landing gear to permit movement on the ground, most of these systems involve adding an entirely new set of motors, gearboxes, and transmission systems (as well as control systems and power distribution) to the aircraft, often resulting in an unacceptable weight increase to the aircraft. Further, space on aircraft is often limited, particularly in the landing gear areas, making it difficult to add components to drive an autonomous taxiing system.

SUMMARY

Embodiments of autonomous taxiing systems for aircraft are set forth below according to technologies and methodologies of the present disclosure. Landing gear for an aircraft are configured with a taxiing system that utilizes existing brake systems components to power the taxiing system. More specifically, existing motors that selectively actuate the aircraft brake systems are also configured to selectively drive one or more wheels of the aircraft landing gear.

A first representative embodiment of a landing gear system includes a wheel rotatably coupled to the axle about an axis. A motor is fixedly positioned relative to the axle with a first clutch assembly operably coupled to an output shaft of the motor. The landing gear further includes an actuator and a drive assembly. The actuator applies a braking force to the wheel. The drive assembly includes a pinion gear and a drive gear rotatably associated with the pinion gear. The drive gear is configured to transfer a rotational force to the wheel in order to provide autonomous taxiing capability. Both the actuator and the drive assembly are operably coupled to the clutch assembly so that the output shaft of the motor drives both the brake assembly and the drive assembly.

In any embodiment, the first clutch assembly is further configured to selectively transfer rotation of the output shaft to the pinion gear.

In any embodiment, landing gear system further comprises a second clutch assembly, the second clutch assembly selectively coupling and uncoupling the drive gear and the wheel.

In any embodiment, the actuator comprises a ball screw, the ball screw is selectively rotatable in a first direction and a second direction to extend and retract, respectively, the ball screw.

In any embodiment, the ball screw generates a braking force when the ball screw is in an extended position.

In any embodiment, the first clutch assembly is configured to selectively maintain the ball screw position when the actuator is uncoupled from the output shaft of the motor.

In any embodiment, the landing gear system further comprises a second motor fixedly positioned relative to the axle, and a third clutch assembly operably coupled to an output shaft of the second motor. A second actuator is operably coupled to the third clutch assembly and is configured to apply a braking force to the wheel. The third clutch assembly is configured to selectively couple and uncouple the second actuator and the output shaft of the second motor. A second drive assembly is operably coupled to the third clutch assembly and comprises a second pinion gear in meshed engagement with the drive gear. The third clutch assembly is configured to selectively transfer rotation of the output shaft of the second motor to the second actuator.

In any embodiment, the landing gear system further comprises a third actuator, the first, second, and third actuators being radially spaced from the axis and equally spaced apart from each other.

A second representative embodiment of a landing gear system includes a wheel rotatably coupled to an axle about an axis. A plurality of brake actuation assemblies is disposed circumferentially around the axis and configured to selectively apply a braking force to the wheel. Each brake actuation assembly comprises a motor fixedly positioned relative to the axle and a first clutch assembly operably coupled to an output shaft of the motor. Each brake assembly further comprises an actuator configured to apply a braking force to the wheel, wherein the first clutch assembly is configured to selectively couple and uncouple the actuator and the output shaft of the motor. A drive assembly comprises a plurality of gearboxes, each gearbox being configured to be driven by the first clutch assembly of one of the plurality of brake actuation assemblies. The drive assembly further comprises a plurality of pinion gears, each pinion gear being rotated one of the plurality of gearboxes, and a drive gear in meshed engagement with each of the plurality of pinion gears. Rotation of the pinion gears rotates the drive gear about the axis. The drive gear is configured to selectively engage the wheel to transfer a rotational force from the plurality of pinion gears to the wheel.

In any embodiment, the landing gear system further comprises a second clutch selectively engaging and disengaging the drive gear from the wheel.

In any embodiment, the plurality of brake actuation assemblies is defined by three brake actuation assemblies arranged in a triangular pattern.

In any embodiment, each of the first clutch assemblies being configured to selectively lock the associated actuator in a fixed position when the actuator is uncoupled from the associated motor.

In any embodiment, rotation of the drive gear rotates the motor of each of the plurality of brake actuation assemblies.

In any embodiment, each first clutch is configured to selectively couple and uncouple the associated pinion gear from output shaft of the associated motor.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Examples of an autonomous electric taxiing wheel for an aircraft landing gear with electrically actuated brake are set forth below according to technologies and methodologies of the present disclosure. In an embodiment, existing actuators that drive the brakes are also utilized to provide a rotational force to the wheels that allows the aircraft to move without the use of tow tractors or engine thrust.

Figure 1:
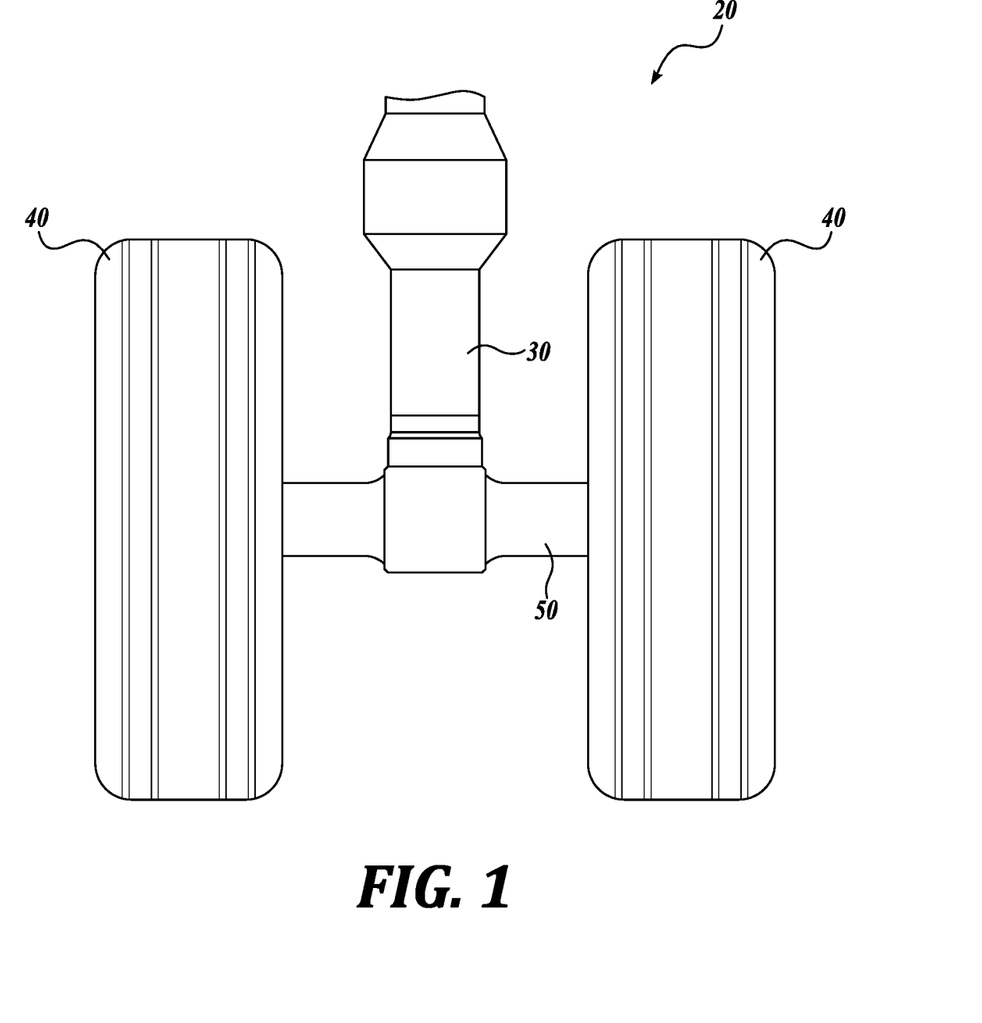
FIG. 1 shows a rear view of a first representative embodiment of a landing gear system with an autonomous electric taxiing wheel with electrically actuated brake according to the present disclosure.
Figure 2:
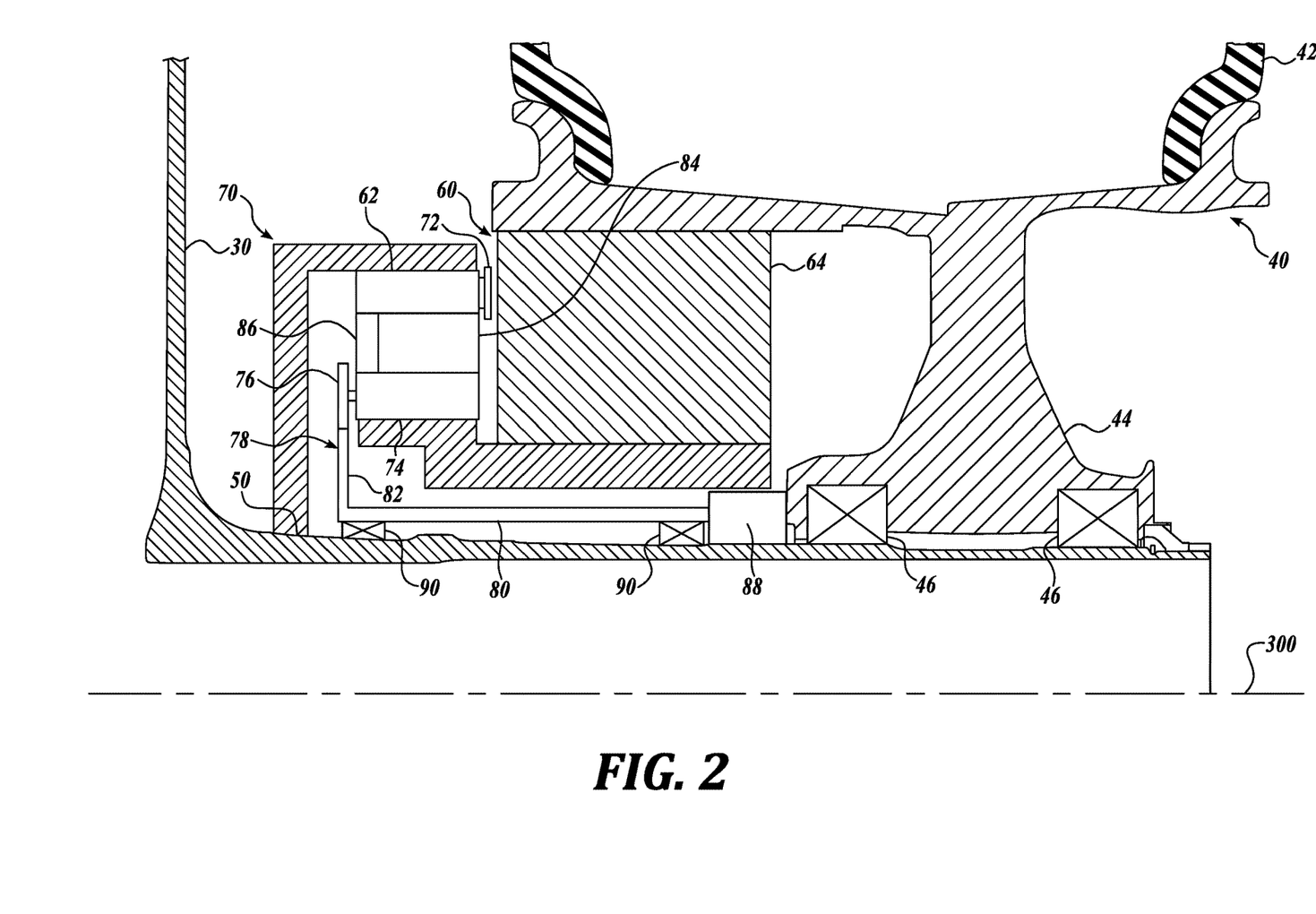
FIG. 2 shows a partial cross-sectional view thereof.
Figure 3:
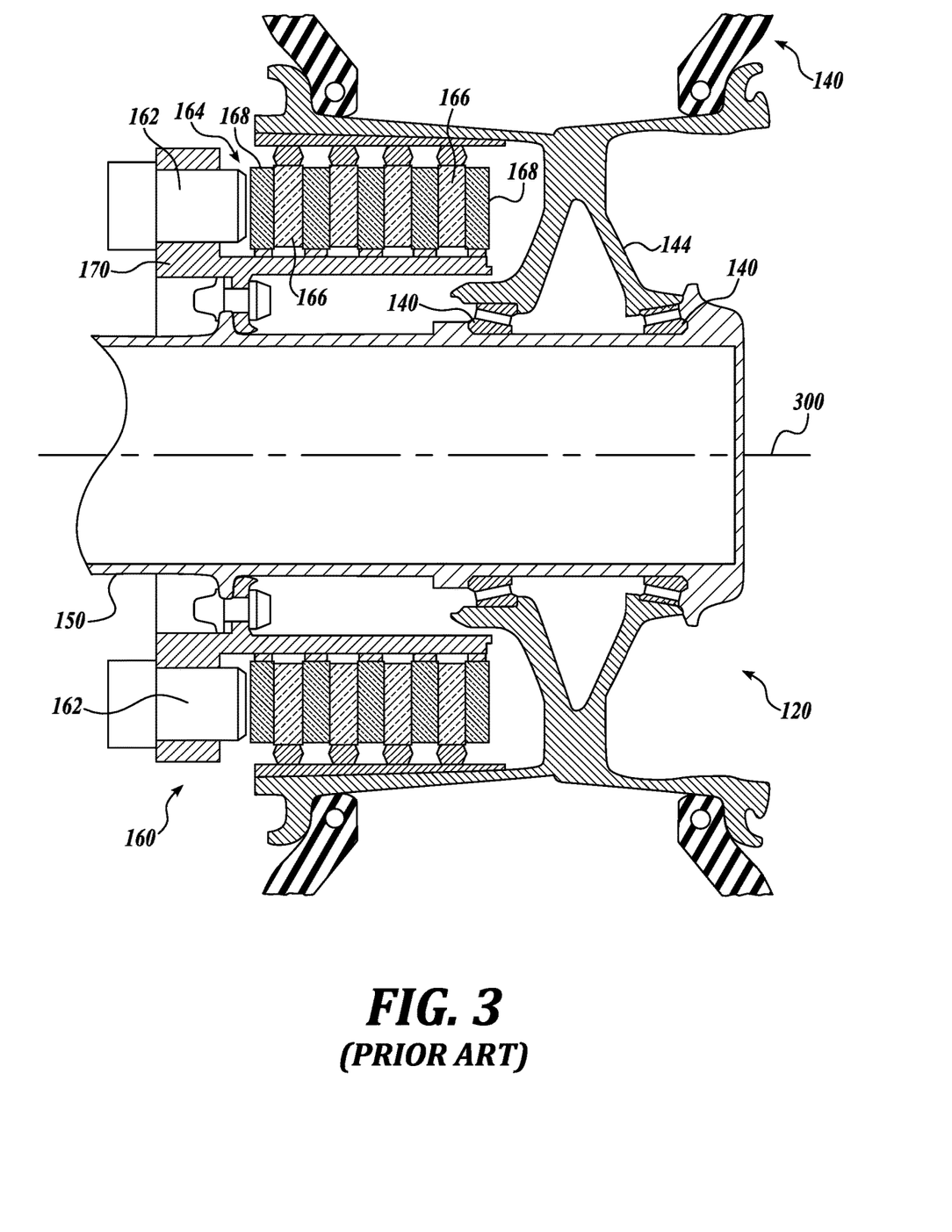
FIG. 3 shows a partial cross-sectional view of a known brake assembly for an aircraft landing gear.

FIGS. 1-3 show a first representative embodiment of a landing gear system 20 according to the present disclosure is shown. As shown in FIG. 1, the landing gear system 20 includes a strut 30 and an axle assembly 50. One end of the strut 30 is coupled to the aircraft (not shown), and the other end of the strut is coupled to the axle assembly 50. In the illustrated embodiment, the axle assembly 50 extends laterally outward from the strut 30 and has a wheel 40 rotatably mounted to each end.

As best shown in FIG. 2, each wheel 40 includes a pneumatic tire 42 mounted to a rim 44. The rim 44 is mounted to the axle assembly 50 by a pair of bearings 46. The bearings 46 allow the wheel 40 to rotate about the centerline 300 of the axle assembly 50.

At least one of the wheels 40 of the landing gear assembly 20 is associated with a brake assembly 60. The brake assembly 60 applies a braking force to the wheel 40 that resists rotation of the wheel relative to the axle assembly 50. In this manner, the brake assembly 60 can apply a braking force to slow and/or stop a rotating wheel 40, thereby slowing/stopping the aircraft. In some embodiments, the brake assembly 60 is configured to apply a braking force to a stationary wheel 40 so that the brake assembly also acts as a parking brake that prevents unwanted movement of a parked aircraft.

The brake assembly 60 includes a plurality of linear actuators 62 positioned radially around the centerline 300 of the axle assembly 50, i.e., the axis of rotation of the wheel 40. The linear actuators 62 selectively extend in unison to apply a force that compresses a stack 64 of alternating stators and rotors. In the disclosed embodiment, the linear actuators 62 and stack 64 are similar to those disclosed in U.S. Pat. No. 8,839,918, issued to Thibault et al., ("Thibault") and currently assigned to Safran Landing Systems, the disclosure of which is expressly incorporated herein.

FIG. 3 shows a representative brake assembly 160 of a landing gear assembly 120 disclosed by Thibault. The brake assembly 160 and landing gear assembly 120 of Thibault will be described with the understanding that unless otherwise noted, the brake assembly 60 and landing gear assembly 20 shown in FIG. 2 is similarly configured to the brake assembly 160 and landing gear assembly 120 shown in FIG. 3. Further, components of the brake assembly 60 and landing gear assembly 20 correspond to components of the brake assembly 160 and landing gear assembly 120, wherein a component with a reference number XX in FIG. 2 corresponds to a component with a reference number 1XX in FIG. 3.

The brake assembly 160 has an annular bracket 170 fixedly coupled to the axle assembly 150 of the landing gear. The bracket 170 is configured to provide mounting interfaces for brake components that remain fixedly positioned relative to the landing gear axle assembly 150. In some embodiments, several brackets are utilized to fixedly mount the brake components to the axle assembly 150. In some embodiments, one or more brake components are fixedly mounted other landing gear components to maintain a fixed position relative to the axle assembly 150.

The illustrated brake assembly 160 is a multi-disc brake assembly that includes a stack 164 of discs. More specifically, the stack includes a series of alternating rotors 166 and stators 168, Each of the rotors 166 is keyed to the rim 144 of the wheel 140 so that the rotors rotate in unison with the wheel. Each of the stators 168 is keyed to the axle assembly 150 and remains rotationally fixed relative to the axle assembly 150. Thus, when the aircraft wheels 140 rotate, e.g., during takeoff, landing, and taxiing, the rotors 166 rotate with the wheels relative to the stators 168.

A plurality of actuators 162 are mounted to the bracket 170 and are spaced radially around the axle assembly 150. The actuators 162 are linear actuators that selectively extend and retract in unison. When the actuators 162 extend, they compress the stack 164 so that adjacent stators 166 and rotors 168 engage each other. When the stack 164 is compressed, and the rotors 168 are rotating with the wheels 140, friction between the rotors and the stators 166 generate a resistive braking force that is reacted to the wheels through the stators. When the actuator is retracted, the stators 166 and rotors 168 disengage from each other, and the restive braking force ceases.

In the illustrated embodiment of FIG. 3, the actuators 162 are ball screws driven by the rotary output of one or more motors (not shown). In some embodiments, the actuators 162 are hydraulic or pneumatic linear actuators. It will be appreciated that the brake assemblies are not limited to a particular actuator configuration or configurations, and any number and/or combination of actuators suitable for applying a compressive force to the brake stack 164 may be utilized.

Figure 4:
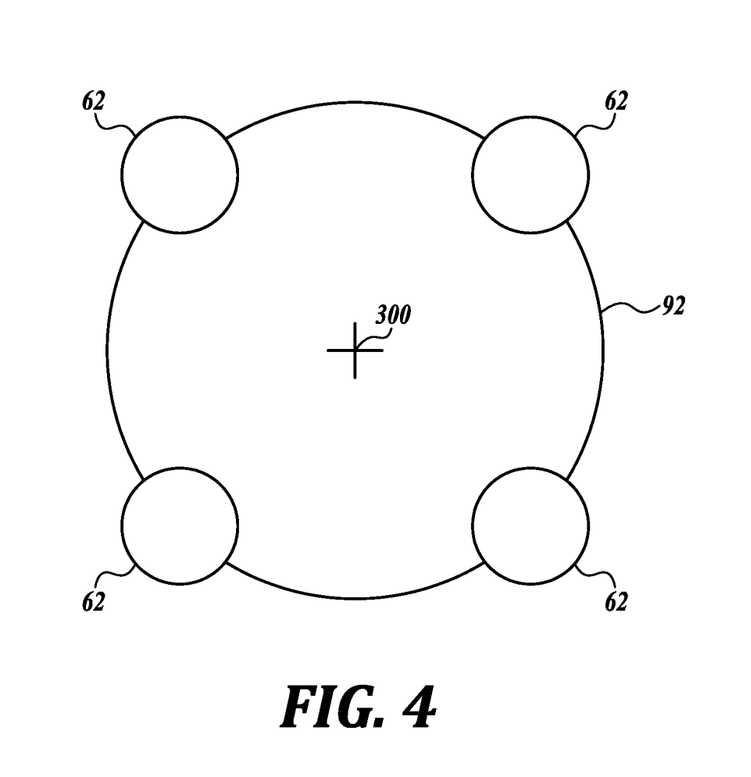
FIG. 4 shows a schematic view of a first representative arrangement of a brake assembly components.

Known brake assemblies 160 typically have four or more actuators 162 spaced evenly around the centerline 300 of the axle assembly 150 along a circle 92. An embodiment with four actuators 162 is shown in FIG. 4. In the event of a single actuator failure, the four-actuator configuration will still have the three remaining actuators in a triangular arrangement applying the compressive force to the stack 164. Under such circumstances, the application of force is sufficiently even across the stack to prevent further issues. If less than four actuators were utilized, the failure of a single actuator would result in compressive forces being applied to the stack 164 by two or even a single actuator. In both cases, the forces applied to the stack 164 would be unacceptably asymmetric. Accordingly, known brake assemblies typically require four actuators as a practical minimum. Other embodiments may include more than four actuators, depending upon weight and space restriction.

Referring back to FIG. 2, a plurality of linear actuators 62 is mounted to a bracket 70, similar to the bracket 170 of FIG. 3, so that each of the actuators maintains a fixed position relative to the axle assembly 50. The bracket 70 also engages the stack 64. More specifically, the stators (not shown) of the stack 64 are keyed the bracket 70 so that the stators are rotationally fixed about the centerline 300 of the axle assembly 50.

Each linear actuator 62 is preferably a ball screw operably connected to a motor 84 by a clutch assembly 86, both of which are also fixedly positioned relative to the axle assembly 50. As will be described in further detail, the clutch assembly 86 is configured so that rotation of the output shaft of the associated motor 84 drives an actuator 62 of the brake assembly 60 and also provides a driving force to the wheel 40 to enable autonomous taxiing capability. In this regard, the clutch assembly 86 selectively transfers rotation of the output shaft of the motor 84 to (1) a first clutch output shaft that drives the actuator 62, and (2) a second clutch output shaft that provides autonomous taxiing capability to at least one of the wheels 40 of the aircraft.

In the illustrated embodiment, a separate motor 84 is provided for each linear actuator 62. In some embodiments, a single motor 84 is operably configured to drive more than one of the linear actuators 62. Each motor 84 is preferably an electric motor with selectively rotatable output shaft. The output shaft of the motor 84 provides a driving rotational force to the clutch assembly 86, which in turn, selectively rotates a first clutch output shaft that is operatively coupled to the linear actuator 62. In the illustrated embodiment, the clutch assembly 86 is configured to rotate the first output shaft, and thus the ball screw, in (1) a first direction to extend the ball screw, and (2) a second direction to retract the ball screw. When the ball screw extends, an end fitting 72, which is mounted to the end of the ball screw, engages the stack 64 of rotors and stators to apply a brake clamping force that generates a resistive wheel braking torque.

In addition to driving one or more of the brake actuators 62 to activate the brake assembly 60, each motor 84 is also operable coupled to a gearbox 74 through the clutch assembly 86. The gearbox 74 is a reduction gearbox selectively driven by a second output shaft of the clutch assembly 86. The gearbox 74 converts the rotational input of the second output shaft of the clutch assembly 86 into a rotational output having a lower rotational speed but a higher torque. This rotational output rotates a pinion gear 76 that is coupled to the gearbox 74.

A drive gear 78 is mounted to the axle assembly 50 and engages the pinion gear 76. The drive gear 78 includes a cylindrical body 80 with a gear 82 located at one end. The cylindrical body 80 surrounds a portion of the axle assembly 50 and is mounted thereto by a plurality of bearings 90 so that the drive gear 78 is rotatable about the centerline 300 of the axle assembly. The gear 82 is in meshed engagement with the pinion gear 76. As a result, rotation of the pinion gear 76 by the motor 84 also rotates the drive gear 78 about the centerline of the axle assembly 50.

A second end of the body of the drive gear 78 is operably coupled to a drive gear clutch assembly 88 that selectively engages and disengages the drive gear from the rim 44 of the wheel 40. In some embodiments, the drive gear clutch assembly 88 is a dog clutch that surrounds the axle assembly 50. In some embodiments, the clutch is a curvic clutch that surrounds the axle assembly 50. It will be appreciated that any suitable clutch configuration may be used to selectively engage and disengage the drive gear 78 from the wheel 40, and such configurations should be considered within the scope of the present disclosure.

In operation, the motors 84 that surround the axle assembly 50 are operated in unison to selectively provide (1) a braking force that resists rotation of the wheel, and (2) a driving force that rotates one or more wheels 40 to provide autonomous taxiing capability. To provide a braking force, the drive gear clutch assembly 86 provided with each motor 84 couples the output shaft of the motor with the corresponding linear actuator(s) 62. With the linear actuators 62 engaged with their respective motors 84, the motors extend the linear actuators so that the end fittings 72 are driven into the stack 64 of rotors 66 and stators 68, which are compressed into each other to provide a resistive braking force. The braking force is reacted through the bracket 70 to the axle assembly 50, i.e. to a fixed portion of the landing gear.

To terminate the braking activity, rotation of the output shafts of the motors 84 is reversed to retract the linear actuators 62, thereby disengaging the end fittings 72 from the brake stack 64 and eliminating the resistive braking force provided by the friction between the rotors 66 and stators 68. In some embodiment, retraction of each linear actuator 62 is achieved by reversing the rotational direction of the output shaft of the associated motor 84. In some embodiments, retraction of each linear actuator 62 is achieved by the clutch assembly 86 selectively reversing the rotational direction of the first clutch output shaft while the rotational direction of the output shaft of the motor 84 continues in the same direction.

In addition to providing a braking force by driving the linear actuators 62, the motors 84 also cooperate to provide a driving force that rotates one or more wheels 40. In this regard, each of the pinion gears 76 is operably coupled to the drive gear 78. When taxiing is required, all of the motors 84 are activated, and each clutch assembly 86 engages its second output shaft with the associated gearbox 74 to rotate the pinion gear 76. Each pinion gear 76, in turn, applies a torque to the drive gear 78 so that the total torque applied to the drive gear is the sum of the torques applied by the individual pinion gears 76. With the drive gear clutch assembly 88 engaged, rotation of the drive gear 78 rotates the rim 44 and thus, the wheel 40, to provide autonomous taxiing capabilities.

Because the drive gear clutch assembly 88 selectively disengages the wheel 40 from the drive gear 78 when autonomous taxiing is not needed, the wheel is free to rotate about the centerline 300 of the axle assembly 50 without rotating components of the drive assembly. Thus, the drive assembly doe not impart a drag force on the wheel due to inertia and/or friction of the components. Further, because the drive components do not move when the drive gear clutch assembly 88 is disengaged, component wear and potential failure is reduced.

In some embodiments, the direction of the output shaft of the motor 84 is selectively reversible to provide for autonomous taxiing in both forward and aft directions. In some embodiments, the clutch assembly 86 selectively rotates the second output shaft in first and second directions in response to rotation of the output shaft of the motor 84 in a single direction. In some embodiments, the drive gear clutch assembly 88 selectively rotates the wheel 40 in first and second directions in response to rotation of the drive gear 78 in a first direction.

Still referring to FIG. 2, in another embodiment, the second output shaft of each clutch assembly 86 remains engaged with its corresponding gearbox 74. The wheel 40 can be disengaged from the drive assembly by selectively disengaging the rim 44 from the drive gear 78 via the drive gear clutch assembly 88; however, because the second output shaft of each clutch assembly 86 remains engaged with its corresponding gearbox 74, all of the motors 84 remain engaged with each other by virtue of the engagement of the pinion gears 76 with the drive gear 78. As a result, in the event that one or more motors 84 fail, the remaining motors will continue to drive the failed motor or motors. In these circumstances, the output shaft of each motor continues to rotate and is capable of driving its associated linear actuator 62. Because all of the linear actuators 62 are driven to extend during a braking condition, even when one or more motors 84 fail, the risk of asymmetric loading of the brake stack 64 is eliminated.

Figure 5:
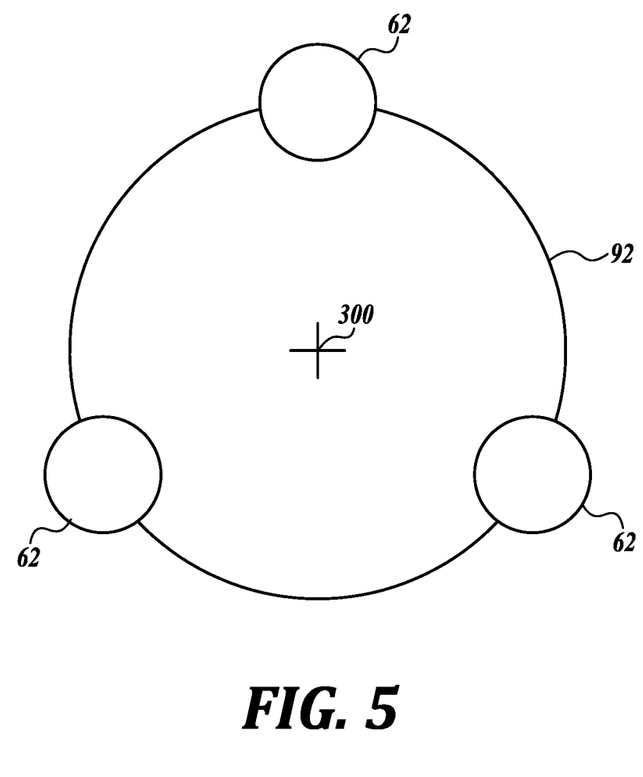
FIG. 5 shows a schematic view of a second representative arrangement of a brake assembly components.

Eliminating the risk of asymmetric loading allows for an embodiment with three actuators 62 and associated motors 84, as shown in FIG. 5. In the embodiment of FIG. 5, three actuators 62 are spaced evenly around the centerline 300 of the axle assembly 50 along a circle 92. In another embodiment, only two actuators 62 and associated motors 84 are used. While the gear ratios and motor sizes must be adjusted to provide sufficient driving power with fewer motors, the overall size and weight of the system is still reduced. In yet another embodiment, more suitable for small aircraft, a single actuator 62 and associated motor 84 are used. It will be appreciated that the number and location of actuators is not limited to the disclosed embodiments, and any suitable number of actuators may be used, and such configurations should be considered within the scope of the present disclosure.

In another embodiment, the clutch assembly 86 is configured to selectively lock the linear actuator 62 when the motor 84 is disengaged from the first output shaft of the clutch assembly, i.e., linear actuator is disengaged from the motor. In one embodiment, the clutch assembly 86 includes a dog clutch that selectively engages the ball screw of the linear actuator 62 and fixedly positions the ball screw relative to a fixed portion of the landing gear assembly 20. By locking the ball screw, the clutch assembly 86 enables the linear actuators 62 to provide a parking brake function. More specifically, with the first output shaft of each clutch assembly 86 engaging the associated linear actuator 62, the motors 84 can extend the linear actuators 62 to compress the brake stack 64 into a braking condition. The first output shaft of each clutch assembly 86 is then disengaged from the associated linear actuator 62, and the linear actuators are locked in place, i.e. in a braking condition so that the brake assembly 60 acts as a parking brake until the linear actuators 62 are retracted.

In addition to providing parking brake functionality, the selective locking of the linear actuator 62 by the clutch assembly 86 also provides for continued monitoring/control of the linear actuator position. When the linear actuator is retracted, i.e., when the brakes are disengaged, the motor 84 selectively drives the drive gear 78 when autonomous taxiing is needed. Typically, the position of the linear actuator 62, for example, a ballscrew, is not directly measured by a sensor, but rather is monitored by counting pulses from the motor 84. If the linear actuator 62 is not locked when the linear actuator is disengaged from the motor 84, motor pulses would not always correspond to movement of the linear actuator, and a separate sensor would be required to monitor the position of the linear actuator. By locking the linear actuator 62, the need for additional sensors is avoided. Instead, when the linear actuator 62 is disengaged from the motor 84, the linear actuator is locked in a known position, until the motor re-engages with the linear actuator.

The present application may reference quantities and numbers. Unless specifically stated, such quantities and numbers are not to be considered restrictive, but exemplary of the possible quantities or numbers associated with the present application. In this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the disclosure in which an exclusive property or privilege is claimed are defined as follows:

1. A landing gear system, comprising:
   an axle;
   a wheel rotatably coupled to the axle about an axis;
   a first motor fixedly positioned relative to the axle;
   a first clutch assembly operably coupled to an output shaft of the first motor;
   a first actuator operably coupled to the first clutch assembly and configured to apply a braking force to the wheel, the first clutch assembly being configured to selectively couple and uncouple the first actuator and the output shaft of the first motor; and
   a drive assembly operably coupled to the first clutch assembly, the drive assembly comprising:
   a pinion gear rotated by the output shaft of the first motor, and a drive gear in meshed engagement with the pinion gear, the drive gear comprising a cylindrical body portion and a gear portion, the cylindrical body being rotatably mounted about the axis, the axle extending through the cylindrical body, the gear being disposed at a first end of the cylindrical body portion, the drive gear being configured to transfer rotation of the output shaft to the wheel, wherein the first clutch assembly is configured to selectively transfer rotation of the output shaft to the first actuator.

2. The landing gear system of claim 1, wherein the first clutch assembly is further configured to selectively transfer rotation of the output shaft to the pinion gear.

3. The landing gear system of claim 1, further comprising a second clutch assembly, the second clutch assembly selectively coupling and uncoupling the drive gear and the wheel.

4. The landing gear system of claim 1, wherein the first actuator comprises a ball screw, the ball screw being selectively rotatable in a first direction and a second direction to extend and retract, respectively, the ball screw.

5. The landing gear system of claim 4, wherein the ball screw generates a braking force when the ball screw is in an extended position.

6. The landing gear system of claim 5, wherein the first clutch assembly is configured to selectively maintain the ball screw position when the first actuator is uncoupled from the output shaft of the first motor.

7. The landing gear system of claim 1, further comprising:
a second motor fixedly positioned relative to the axle;
a third clutch assembly operably coupled to an output shaft of the second motor;
a second actuator operably coupled to the third clutch assembly and configured to apply a braking force to the wheel, the third clutch assembly being configured to selectively couple and uncouple the second actuator and the output shaft of the second motor; and
a second drive assembly operably coupled to the third clutch assembly, the second drive assembly comprising:
a second pinion gear in meshed engagement with the drive gear, wherein the third clutch assembly is configured to selectively transfer rotation of the output shaft of the second motor to the second actuator.

8. The landing gear system of claim 7, further comprising a third actuator, the first, second, and third actuators being radially spaced from the axis and equally spaced apart from each other.

9. A landing gear system, comprising:
a wheel rotatably coupled to an axle about an axis;
a plurality of brake actuation assemblies disposed circumferentially around the axis and configured to selectively apply a braking force to the wheel, each brake actuation assembly comprising:
a motor fixedly positioned relative to the axle;
a first clutch assembly operably coupled to an output shaft of the motor; and
an actuator configured to apply a braking force to the wheel, the first clutch assembly being configured to selectively couple and uncouple the actuator and the output shaft of the motor; and
a drive assembly, comprising:
a plurality of gearboxes, each gearbox being configured to be driven by the first clutch assembly of one of the plurality of brake actuation assemblies;
a plurality of pinion gears, each pinion gear being rotated one of the plurality of gearboxes; and
a drive gear in meshed engagement with each of the plurality of pinion gears, rotation of the pinion gears rotating the drive gear about the axis, the drive gear being configured to selectively engage the wheel to transfer a rotational force from the plurality of pinion gears to the wheel.

10. The landing gear system of claim 9, further comprising a second clutch selectively engaging and disengaging the drive gear from the wheel.

11. The landing gear system of claim 9, wherein the plurality of brake actuation assemblies is defined by three brake actuation assemblies arranged in a triangular pattern.

12. The landing gear system of claim 9, each of the first clutch assemblies being configured to selectively lock the associated actuator in a fixed position when the actuator is uncoupled from the associated motor.

13. The landing gear system of claim 9, wherein rotation of the drive gear rotates the motor of each of the plurality of brake actuation assemblies.

14. The landing gear system of claim 9, wherein each first clutch is configured to selectively couple and uncouple the associated pinion gear from output shaft of the associated motor.

* * * * *